United States Patent [19]

Weber et al.

[11] Patent Number: 4,687,830

[45] Date of Patent: Aug. 18, 1987

[54] PROCESS FOR THE PRODUCTION OF LIGHT-STABLE, SOLVENT-RESISTANT POLYURETHANE-UREA ELASTOMER COATINGS BY REACTIVE COATING

[75] Inventors: Karl-Arnold Weber, Leverkusen; Hans-Josef Buysch, Krefeld; Karl-Ludwig Noble, Koeln; Harro Träubel, Leverkusen, all of Fed. Rep. of Germany

[73] Assignee: Bayer Aktiengesellschaft, Leverkusen, Fed. Rep. of Germany

[21] Appl. No.: 874,308

[22] Filed: Jun. 13, 1986

[30] Foreign Application Priority Data

Jun. 27, 1985 [DE] Fed. Rep. of Germany ....... 3522978

[51] Int. Cl.$^4$ ............................................. C08G 18/10
[52] U.S. Cl. ...................................... 528/64; 427/389; 427/389.9; 428/423.4; 428/423.7; 428/425.1
[58] Field of Search ............... 528/64; 427/389, 389.9; 428/423.4, 423.7, 425.1

[56] References Cited

U.S. PATENT DOCUMENTS

| | | | |
|---|---|---|---|
| 2,721,811 | 10/1955 | Dacey et al. | 117/65 |
| 3,194,793 | 7/1965 | Kogon | 260/77.5 |
| 3,281,396 | 10/1966 | Barnes | 260/75 |
| 3,475,266 | 10/1969 | Strassel | 161/190 |
| 4,108,842 | 8/1978 | Konig et al. | 528/61 |
| 4,248,756 | 2/1981 | Konig et al. | 260/31.2 |
| 4,299,868 | 11/1981 | Berndt et al. | 427/389.9 |
| 4,363,686 | 12/1982 | Komarek | 156/242 |
| 4,594,385 | 6/1986 | Thoma et al. | 524/839 |

FOREIGN PATENT DOCUMENTS

| | | |
|---|---|---|
| 872268 | 2/1953 | Fed. Rep. of Germany . |
| 957564 | 2/1957 | Fed. Rep. of Germany . |
| 3011711 | 10/1981 | Fed. Rep. of Germany . |
| 3309992 | 4/1984 | Fed. Rep. of Germany . |
| 2945614 | 5/1984 | Fed. Rep. of Germany . |

OTHER PUBLICATIONS

Society of Leather Technologists and Chemists V. 57, p. 59 (1973).
Polyurethanes in Leather Finishing and Coating Technicuir, No. 2, Feb. 1970, p. 29, by P. Arbaud, p. 29.

*Primary Examiner*—Maurice J. Welsh
*Attorney, Agent, or Firm*—Gene Harsh; Joseph C. Gil; Thomas W. Roy

[57] ABSTRACT

The present invention is directed to a process for the production of light-stable, solvent-resistant polyurethane urea elastomer coatings by the reactive coating process wherein NCO prepolymers are reacted with 4,4'-diamino-$C_1$–$C_4$-tetraalkyldicyclohexylalkanes containing up to 4 carbon atoms in the alkyl group with continuous mixing and continuous discharge of the reaction mixture.

7 Claims, No Drawings

PROCESS FOR THE PRODUCTION OF LIGHT-STABLE, SOLVENT-RESISTANT POLYURETHANE-UREA ELASTOMER COATINGS BY REACTIVE COATING

BACKGROUND OF THE INVENTION

1. Field of the Invention

This invention relates to a process for the production of light-stable, solvent-resistant polyurethane-urea elastomer coatings by reactive coating wherein NCO prepolymers are reacted with diamino-$C_1$–$C_4$-tetraalkyldicyclohexylalkanes containing up to 4 carbon atoms in the alkyl group with continuous mixing and continuous discharge of the reaction mixture.

2. Description of the Prior Art

The coating of substrates such as leather, skiver, textile materials or nonwovens with polyurethanes by reactive coating has been known for some time, cf. for example DE-PS No. 872,268 (Example 8), DE-PS No. 957,564, DE-A No. 1,023,449, DE-PS No. 1,240,656, US-PS No. 3,194,793 and, in particular, DE-AS No. 1,570,524. In the process described in DE-AS No. 1,570,524, an NCO prepolymer optionally dissolved in a solvent is sprayed together with an organic diamine dissolved in a solvent onto the substrate to be coated, the equivalent ratio of amino to hydroxyl groups being above 0.5 and the equivalent ratio of isocyanate groups to the sum of hydroxyl and amino groups being between 0.95 and 1.6.

On a laboratory scale polyurethane urea elastomers may be produced from a variety of the starting components described in the publications cited above mixed in various ratios with one another. Unfortunately, formulations such as these generally cannot be applied with any success at an industrial scale because, on the one hand, particular attention has to be paid to the processibility of the reactants (for example their viscosity, especially their reactivity) and, on the other hand, the stringent physical property requirements of the polyurethane coatings. The difficulty in this regard is that the desired properties of the polyurethane urea (for example hydrolysis stability, high flexural strength, tensile strength, low-temperature flexibility and light stability) conflict with one another i.e., products showing high hydrolysis stability and tensile strength generally show poor flexural strength and low-temperature flexibility and vice-versa.

In addition, reactivity problems often prevent the process from being carried out on an industrial scale. If the individual components are combined by external mixing, e.g. by whirling two streams of liquids together in air as is preferred according to DE-AS No. 1,570,524, the reactants generally cannot be thoroughly and uniformly mixed (P. Arbaud, Technicuir, No. 2, February 1970, page 29). Accordingly, zones having different physical properties, particularly with regard to light stability, flexural strength and tear strength, are formed in the coating (cf. H. Traubel, "Polyurethanes in Leather Finishing and Coating", J. of the Soc. of Leather Techn. and Chem. 57, page 61 (1973)).

According to DE-AS No. 26 37 115, the reactivity problems may be overcome by processing NCO prepolymers with blocked aliphatic amines or adducts containing amino groups. The aliphatic amines have to be blocked because the free aliphatic amines cannot be reacted with the NCO prepolymers in such a way as to form a film or a coating composition which levels uniformly and adheres sufficiently to the substrate. In addition, the reaction with the free aliphatic amines takes place so quickly that the mixing units immediately become clogged up with reaction products.

From DE-OS No. 29 45 614, page 11, it is known that cycloaliphatic compounds based on 4,4'-diamino-3,3',5,5'-tetraalkyldicyclohexylmethane ($C_1$–$C_4$ alkyl groups), which are obtained by a process described in this publication, may be used for the production of polycondensation plastics such as polyamines, polyurethanes, polyureas and epoxy resins.

DE-OS No. 3,011,711 describes an improved process for coating substrates with polyurethane ureas by reacting an NCO prepolymer based on a mixture of a diisocyanate and 2 to 20 mole % of a triisocyanate with the partly blocked hardener system described in DE-OS No. 2,637,115. The triisocyanate used is a trimer of tolylene diisocyanate or a mixed trimer of tolylene diisocyanate and hexane diisocyanate. Preferred NCO prepolymers are based on tolylene diisocyanate.

DE-OS No. 33 09 992 describes a process for coating skiver which comprises applying a top coat to a temporary support and then a reactive mixture which only forms a high molecular weight polyurethane from the top coat and then pressing the skiver into the reacting mass. The reactive system contains blocked NCO prepolymers and cycloaliphatic diamines such as dicyclohexyl methane diamines. The blocked NCO prepolymers are synthesized using aromatic polyisocyanates and are preferably blocked by ketoximes (cf. for example DE-OS Nos. 28 14 079, 29 02 090, 31 34 161 and 30 04 327).

However, the reaction of NCO prepolymers based on aromatic diisocyanates with aliphatic or cycloaliphatic diamines is so fast that either the prepolymers have to be blocked (for example with ketoximes) or the diamines have to be blocked (as completely or partly blocked ketimine derivatives). However, the use of blocked components involves numerous disadvantages. With ketoxime-blocked NCO prepolymers, the ketoxime is split off during the reaction, while with ketimine-blocked diamines, the starting ketone has to be split off in a hydrolysis reaction which is not always easy to control. The risk of environmental pollution by the decomposition products necessitates additional technology for retaining the decomposition products.

Accordingly, an object of the present invention is to provide a reactive coating system which does not have the disadvantages of blocked systems, is highly light-stable and does not discolor and is resistant to solvents, but which may be safely processed without interruptions in conventional metering and mixing-and-spraying units.

It has now surprisingly been found that unblocked isocyanate prepolymers based on aliphatic or cycloaliphatic diisocyanates and, optionally, relatively low percentages of polyisocyanates, which contain only NCO groups of (cyclo)aliphatic reactivity in the NCO prepolymer may be reacted in the form of highly concentrated solutions to form polyurethane urea coatings by continuously mixing the reactants in suitable mixing units and applying the resulting mixtures to a temporary support or directly onto the substrate using the reactive coating technique provided that diamino-$C_1$–$C_4$-tetraalkyldicyclohexylalkanes are used as chain extending agents. The NCO prepolymers should have a negligible content of monomeric, aliphatic or cycloaliphatic diisocyanates, i.e. free monomeric diisocyanate contents of <2.0% by weight, preferably <0.5% by weight.

SUMMARY OF THE INVENTION

The present invention is directed to a process for the production of light stable, solvent-resistant polyurethane urea elastomer coatings by reacting
(A) NCO prepolymers based on
  (a) polyhydroxyl compounds having molecular weights of 400 to about 10,000, and an average functionality of about 1.90 to 2.8 and
  (b) an isocyanate component containing
    (1) about 85 to 100% by weight of an aliphatic or cycloaliphatic diisocyanates and
    (2) 0 to about 15% by weight of polyfunctional polyisocyanates containing at most one aromatic NCO group and at least two aliphatic or cycloaliphatic NCO groups.
the terminal NCO group content of the NCO prepolymers being about 0.5 to 6% by weight, the overall functionality f' of the prepolymers (A) being about 1.95 to 2.8, the monomeric diisocyanate content of the NCO prepolymers being <2% by weight and the NCO prepolymers (A) being in liquid form or dissolved in
  (c) inert organic solvents having boiling points of up to 150° C. to form solutions having a solids content of at least about 70% by weight, with
(B) 2,4'- and/or 4,4'-diamino-3,3',5,5'-tetraalkyldicyclohexylalkanes corresponding to the following formula

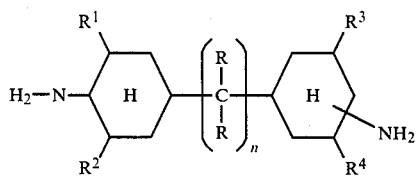

wherein
$R^1$ to $R^4$ may be the same or different and represent straight-chain or branched $C_1$–$C_4$ alkyl groups
R represents H, $CH_3$ or $C_2H_5$ or even $C_3H_7$ or $C_4H_9$ provided that the groups R in the group

contain no more than 4 carbon atoms (preferred is, that the group

contains no more than 4 carbon atoms), and
n equals 1, 2 or 3,
in solution in solvents free from aldehyde- or ketone-carbonyl groups at an NCO:NH2 equivalent ratio of (A) to (B) of about 4.0:1 to 0.85:1 wherein components (A) and (B) are introduced continuously and separately into a mixer and mixed therein, the reactive mixture is continuously discharged and applied in one or more successive layers either to the desired substrate or to an intermediate support after which the substrate is placed in the layer while it is still reacting, and the solvents are optionally removed at elevated temperature.

DETAILED DESCRIPTION OF THE INVENTION

Surprisingly, reactive mixtures showing sufficiently retarded initial reactivity are obtained by the described process from non-blocked NCO prepolymers A and non-blocked free diamines B. They may be mixed and pumped without difficulty in the mixing units, but after application, for example by spraying, they remain briefly in a liquid state (which is crucial to the process because they are able to level uniformly over the substrate or intermediate support) and subsequently react with rapid hardening to form the polyurethane urea.

This result is surprising insofar as, with a number of other known aliphatic or cycloaliphatic diamines, an immediate reaction or gelatinization takes place, contaminating, clogging and hence temporarily stopping the mixing units or applicators or at least giving rise to the formation of inhomogeneous polyurethane urea coatings because the polyurea-forming reaction is already too far advanced during the spraying process.

The process according to the invention is eminently suitable in its reaction velocity for reverse coating or direct coating, as commonly used for coating leather or fabrics. The reaction velocity is important. It must be fast enough to allow a non-tacky film to be formed in about 1 to 5 minutes, preferably about 1.5 to 3 minutes at 20° to 100° C., but must also be slow enough so that a substrate placed in the mixture can be firmly bonded therewith and that the mixture levels uniformly over and unites with the substrate.

A measure of the reaction velocity or rather of the suitability of the reactive mixture is to follow the viscosity of the reactive mixture in a dilute medium in which the degree of reaction may be followed at the same time by NCO titration. The reactivity test applied is described in detail in the examples.

In the reactivity test, the reaction mixture should reach a viscosity value of 60,000 mPas in not less than about 20 seconds and not more than about 500 seconds, preferably in not less than about 50 seconds and not more than about 300 seconds and most preferably in not less than about 80 seconds and not more than about 180 seconds.

The NCO prepolymers (A) used in the process according to the invention are prepared in known manner from relatively high molecular weight polyhydroxyl compounds (a) and excess quantities of aliphatic and, more especially, cycloaliphatic diisocyanates, optionally with addition of aliphatic or cycloaliphatic polyisocyanates, preferably polyisocyanates having an average functionality of ≧3.

Suitable polyisocyanates are also mixed isocyanates which contain only one aromatic NCO group and, in addition, at least two aliphatically or cycloaliphatically bound NCO groups. In the NCO prepolymer, the aromatic NCO group reacts to form a urethane bond, leaving the (cyclo)aliphatic NCO groups to react with the diamines (B).

Preferred relatively high molecular weight polyhydroxyl compounds (a) are hydroxy-polyesters, hydroxypolylactones, hydroxypolycarbonates and hydroxypolyethers or mixtures or mixed condensates thereof. Other suitable relatively high molecular weight polyhydroxyl compounds (a) are the relatively high molecular weight hydroxythioethers, hydroxypolyesteramides, hydroxypolyacetals, vinyl polymers containing functional terminal groups and compounds containing urethane or urea groups. These compounds correspond to the prior art and are described in DE-OS Nos. 28 54 384 and 29 20 501.

The polyesters containing hydroxyl groups suitable for use in accordance with the invention include reaction products of polyhydric, preferably dihydric, and optionally trihydric alcohols with polybasic, preferably dibasic carboxylic acids, polycarboxylic acid anhydrides or polycarboxylic acid esters of lower alcohols. The polycarboxylic acids may be aliphatic, cycloaliphatic, aromatic and/or heterocyclic and may optionally be substituted, for example by halogen atoms, and/or unsaturated. However, the components should be selected in such a way that the melting points of the polyesters formed are not higher than about 60° C. Accordingly, aromatic carboxylic acids such as terephthalic acid are normally only used in relatively small quantities as a co-component. Examples of dicarboxylic acids include succinic acid, adipic acid, suberic acid, azelaic acid, sebacic acid, phthalic acid, phthalic acid anhydride, isophthalic acid, hexahydrophthalic acid anhydride, tetrachlorophthalic acid anhydride, endomethylene tetrahydrophthalic acid anhydride, glutaric acid anhydride, maleic acid, fumaric acid and, in relatively small quantities, other higher functional polycarboxylic acids such as trimellitic acid. Suitable polyhydric alcohols include ethylene glycol, 1,2- and 1,3-propane diol, 1,4- and 2,3-butane diol, 1,6-hexane diol, 2,2,4-trimethyl-1,3- or -2,5-pentane diol, 1,8-octane diol, neopentyl glycol, 1,4- or 1,3-bis-hydroxymethylcyclohexane, 2-methyl-1,3-propane diol, quinitol, 1,4,3,6-dianhydrohexitols, di-, tri-, tetra- and polyethylene glycol, di-, tri-, and tetrapropylene glycol and di-, tri- and tetrapolybutylene glycol. Alcohols having a functionality of more than 2, such as glycerol, trimethylol propane, 1,2,6-hexane triol, 1,2,4-butane triol, trimethylol ethane, pentaerythritol or sorbitol, may also be used in small quantities. The functionality limit defined in detail hereinafter applies to polyesters based on components having a functionality of more than 2. Polyesters of lactones such as ε-caprolactone, hydroxycarboxylic acids such as ω-hydroxycaproic acids or mixed condensates thereof with polycaproic acids and polyols may also be used.

The hydroxypolyethers may be obtained by polymerization of tetrahydrofuran and/or epoxides (such as ethylene oxide, propylene oxide, butylene oxide, styrene oxide or epichlorohydrin) on their own, for example in the presence of boron trifluoride, or by the addition of these epoxides, optionally in admixture or successively, onto starter components containing reactive hydrogen atoms such as water, di- or polyalcohols, aminoalcohols or amines. Known starter components include ethylene glycol, 1,2- or 1,3-propane diol, trimethylol propane, 4,4'-dihydroxydiphenylpropane, aniline, ammonia, ethanolamine or ethylene diamine. Further examples include higher polyoxyalkylene polyols, polyoxytetramethylene glycols, ethoxylates and/or propoxylates of low molecular weight diols and triols, monoamines or diamines, propoxylated trimethylol propane and linear or branched polyoxypropylene glycolethers which may contain a certain percentage of ethylene oxide. It is also possible to use polyethers modified by vinyl polymers of the type formed, for example, by polymerization of styrene or acrylonitrile in the presence of polyethers; polyethers containing polyureas or polyhydrazodicarbonamides and also polybutadienes containing OH groups. Suitable OH-group containing polycarbonates include those which may be obtained by the reaction of diols (such as 1,3-propane diol, 1,4-butane diol, 1,6-hexane diol and/or di-, tri- or tetraethylene glycol) with phosgene or dialkyl carbonates such as diphenylcarbonate.

The relatively high molecular weight polyhydroxyl compounds (a) should have a melting point below about 60° C., preferably below about 45° C.; a molecular weight of 400 to about 10,000, preferably about 600 to 6000; and a functionality f or f' of about 1.9 to 2.8, preferably about 1.98 to 2.7.

The relatively high molecular weight polyhydroxyl compounds (a) may optionally be blended with low molecular weight diols and/or polyols having a molecular weight of 62 to 399. However, the quantity in which the low molecular weight polyols, preferably diols, are used is generally less than about 2 moles of low molecular weight polyols, preferably less than about 1 mole of low molecular weight polyols, per mole of relatively high molecular weight polyhydroxyl compound. Examples of suitable low molecular weight diols or polyols include ethylene glycol, 1,2-propane diol, 1,4-butane diol, 1,6- or 2,5-hexane diol, neopentyl glycol, 2,2,4-trimethyl-1,3-pentane diol, 1,4,3,6-dianhydrohexitols, diethylene glycol, 4,4'-dihydroxydicyclohexylpropane, trimethylol propane, glycerol and trimethylol ethane.

The addition of the low molecular weight compounds, particularly the polyols, is limited by the requirement that the overall mixture of relatively high molecular weight polyhydroxyl compounds and low molecular weight polyols must have an overall functionality f' which does not exceed a value of about 2.8, preferably about 2.7 and most preferably about 2.65.

Polyhydroxypolyesters having a molecular weight of about 1000 to 4000, preferably 1500 to 3000, prepared from adipic acid (and optionally up to about 10 mole %, based on the entire acid component of the polyester, of phthalic acid, isophthalic acid and/or terephthalic acid) and glycols containing 2 to 10 carbon atoms, preferably 4 to 6 carbon atoms, and mixtures thereof (and optionally up to about 4 mole %, preferably about 0.1 to 3 mole %, based on the glycol component of the polyester, of triols, preferably trimethylol propane) are preferably used. Particularly preferred are adipic acid polyesters produced from trimethylol propane in such a quantity that the functionality f' is on average $\geq 2.2$. Glycols suitable for the synthesis of these polyesters include ethylene glycol, diethylene glycol, triethylene glycol and tetraethylene glycol, 1,2-propane diol, 1,3-propane diol, di- and tripropylene glycol, 1,4-butane diol, 2,3-butane diol, 1,5-pentane diol, neopentyl glycol, 1,6-hexane diol and 1,8-octane diol. It is preferred to use a mixture of at least 2 of the diols in a molar ratio of about 1:9 to 9:1, preferably about 3:7 to 7:3, glycols containing from 4 to 6 carbon atoms being particularly preferred. Mixtures of a $C_4$–$C_6$ glycol branched in the alkyl group and a $C_4$–$C_6$ alkylene diol are preferred; mixtures of 1,6-hexane diol and neopentyl glycol are particularly preferred.

The NCO prepolymers are prepared by reacting excess quantities (based on the hydroxyl groups) of aliphatic and, more especially, cycloaliphatic diisocyanates with the previously described polyols. Suitable aliphatic diisocyanates include ethylene diisocyanate, 1,4-tetramethylene diisocyanate, 1,6-, 1,5- and 1,4-diisocyanatohexane and mixtures of these isomers, 2,2,4- and 2,4,4-trimethylhexane-1,6-diisocyanate, 2-methylpentane-1,5-diisocyanate, 2-ethylbutane-1,4-diisocyanate, 5-methylnonane-1,9-diisocyanate, 1,12-dodecane diisocyanate, lysine methylester diisocyanate and preferably cycloaliphatic diisocyanates such as 1-isocyanato-3,3,5-trimethyl-5-isocyanatomethyl-cyclohexane (isophorone diisocyanate), cyclohexane-1,3- and -1,4-diisocyanate and mixtures of these isomers, 1-alkyl-2- or 1-alkyl-3-isocyanatomethylisocyanatocy-clohexane, 2,4- and/or 2,6-diisocyanato-1-methylcy-clohexane and mixtures of these isomers, 1-isocyanato-1-methyl-4(3)-isocyanatomethylcyclohexane, 2,4'- and/or 4,4 -diisocyanatodicyclohexylmethane, 3,3'-dimethyl-4,4'-diisocyanatodicyclohexylmethane, 3-isocyanatomethyl-1-(3,-isocyanatopropyl-1-methyl)-4methylcyclohexane and 1,8-paramenthane diisocyanate. Preferred diisocyanates are cycloaliphatic diisocyanates, more preferably isophorone diisocyanates and 2,4'-and/or 4,4'-diisocyanato-dicyclohexylmethane and most preferably isophorone diisocyanate.

After their formation, the NCO prepolymers should have a negligible content of free, monomeric aliphatic or cycloaliphatic diisocyanates, i.e., a content of <2%, preferably <1% and most preferably <0.5% of free monomeric diisocyanates. This is achieved by ensuring that after the preparation of the NCO prepolymer, any quantities of diisocyanates exceeding a molar ratio of 2:1 (NCO/OH) are removed from the NCO prepolymers by vacuum distillation, thin-layer distillation or extraction.

The formation of the NCO prepolymers may be carried out with small quantities, i.e. quantities of up to about 15% by weight, preferably up to about 5% by weight, of aliphatic and more especially cycloaliphatic polyisocyanates (functionality>2), preferably polyisocyanates (f≧3) and most preferably triisocyanates. Suitable polyisocyanates are biuret triisocyanates, allophanate triisocyanates or trimerization products of aliphatic or cycloaliphatic diisocyanates, in particular 1,6-hexane diisocyanate and isophorone diisocyanate. Other triisocyanates include 4-isocyanatomethyl-1,8-octamethylene diisocyanate and 1,5,11-triisocyanatoundecane. It is also possible to use about 1 to 15% by weight, preferably about 1 to 10% by weight and most preferably about 1 to 5% by weight of polyisocyanates which, aside from aromatically bound NCO groups, contain only aliphatically or cycloaliphatically bound NCO groups, for example mixed trimers based on 3 moles of tolylene diisocyanate and 2 moles of hexane diisocyanate or isophorone diisocyanate. The polyisocyanates preferably contain only one aromatic group in addition to the aliphatically or cycloaliphatically bound NCO groups.

The NCO prepolymers should have an NCO content of about 0.5 to 6.0% by weight, preferably about 2 to 4.5% by weight. The average overall functionality f" of the NCO prepolymers should be about 1.95 to 2.8, preferably about 2.0 to 2.7. The functionality may be increased by using components having a functionality greater than 2 and reduced by addition of small quantities of monofunctional components (such as monoalcohols, asymmetrical dimethyl hydrazine, 4-amino-1,2,2',6,6'-pentamethylpiperidine or monohydrazides) to adjust the desired overall functionality f".

The prepolymers (A) are prepared in liquid form in the melt or by using inert, organic solvents such as ketones, esters, ethers, aromatic hydrocarbons or hydrocarbon mixtures. Examples include acetone, methylethyl ketone, pentanone, hexanone, cyclohexanone, ethylacetate, isopropylacetate, methylpropionate, ethylpropionate, toluene, Solvesso solvent mixtures, diisopropylether, di-n-propylether, di-n-butylether, diisobutylether, tetrahydrofuran, furan and dioxane. Instead of or in addition to these solvents, it is also possible to use PVC plasticizers (such as dibutylphthalate, and dioctylphthalate), phosphoric acid tris-alkylesters, etc.

For technical reasons, the NCO prepolymers are processed in liquid form (from the melt) or from highly concentrated solutions preferably having a solids content of at least about 70% by weight, preferably about 75 to 85% by weight.

NCO prepolymers based on hydroxypolyethers, particularly polyethers containing oxypropylene and/or oxyethylene groups, are products of relatively low viscosity which are generally liquid at room temperature and may be processed without any addition of solvent. Polyester-based NCO prepolymers are generally products of relatively high viscosity which may even solidify and, for this reason, are preferably used in the form of their solutions.

The viscosity of these NCO prepolymers or NCO prepolymer solutions should be about 300 to 100,000 mPa.s/25° C., preferably about 500 to 15,000 mPa.s/25° C. and most preferably about 500 to 5000 mPa.s/25° C. Particularly preferred solvents are ethylacetate, toluene and also methylethylketone.

The 4,4'- and/or 2,4'-diaminotetraalkyldicyclohexylalkanes (B), which may also contain small quantities of 2,2'-isomers, correspond to the following general formula

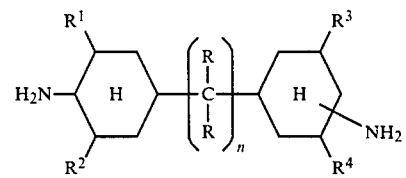

the position of the second amino group representing either the 2- or 4-position. The groups $R^1$ and $R^4$ be the same or different and represent straight-chain or branched $C_1$-$C_4$ alkyl groups such as methyl, ethyl, propyl, isopropyl, butyl, isobutyl or tert.-butyl groups. Diamines in which no more than two of the groups $R^1$ to $R^4$ are methyl groups are preferred. Particularly preferred representatives of the diamines are tetraalkyl derivatives in which the alkyl groups $R^1$ to $R^4$ contain at least two carbon atoms per alkyl group. The groups R independently of one another represent hydrogen or $C_1$-$C_4$ alkyl groups, although the two groups R at one carbon atom should together contain no more than 4 carbon atoms. n is 1, 2, or 3, preferably 1.

The group C(R)(R) is preferably $CH_2$ or $C(CH_3)_2$. The tetraalkyl-substituted diaminodicyclohexylalkanes (B) may be present in the form of mixtures of their stereo isomers or in the form of mixtures of the 4,4'- and 4,2'-diamino compounds. Mixtures of different tetraalkyl-substituted diamines may of course also be used. Examples include the 4,4'-diamino- or 4,2'-diamino-3,5,3',5'-tetraalkylcyclohexylalkanes such as 4,4'-diamino-3,5,3',5'-tetramethyldicyclohexylmethane, 2,4'-diamino-3,5,3',5'-tetramethyldicyclohexylmethane, 4,4'- diamino-(or 2,4'-diamino)-3,5,3',5'-tetramethyldicyclohexyl-[1,1]-ethane or -[1,2]-ethane, 4,4'-diamino-(or 2,4'-diamino)-3,5,3',5'-tetramethyldicyclohexyl-[2,2]-dimethylmethane or -[1,3]-propane, 4,4'-diamino-(or 2,4'-diamino)-3,5,3',5'-tetramethyldicyclohexyl-[1-methyl-1-ethyl]-methane.

The 4,4'-diamino-3,5,3',5'-tetraalkyldicyclohexylalkane compounds are preferred to the corresponding 2,4'-diamino compounds. In addition, the diamines of the dicyclohexylmethane series are preferred to those of the dicyclohexyl-[2,2]-dimethylmethane series. The 2,4'-isomers are generally present in the 4,4'-isomers as secondary constituents (resulting from the synthesis). In addition, the 2,2'-isomers are present in an even smaller quantity as tertiary constituents.

The groups $R^1$ to $R^4$ independently of one another may also be $C_1$–$C_4$ alkyl groups such as 4,4'-diamino-3,3',5-trimethyl-5'-tert.-butyldicyclohexylmethane or 3,3',5-trimethyl-5'-isopropyldicyclohexylmethane.

Preference is attributed to diaminotetraalkyldicyclohexyl alkanes in which no more than two of the groups $R^1$ to $R^4$ are methyl groups, such as 4,4'-diamino-3,5-dimethyl-3',5'-diisopropyldicyclohexylmethane or 4,4'-diamino-3,5-dimethyl-3,5'-diethyldicyclohexylmethane.

Particularly preferred representatives of the diamines are the tetraalkyl derivatives containing at least two carbon atoms in each of the alkyl groups $R^1$ to $R^4$, for example 2,4'-diamino-3,5,3',5'-tetraethyldicyclohexylmethane, 4,4'-diamino-3,5,3',5'-tetraethyldicyclohexyl-[2,2]-dimethylmethane, 4,4'-diamino-3,5,3',5'-tetraethyldicyclohexylmethane or 4,4'-diamino-3,5,3',5'-tetraisopropyldicyclohexylmethane.

The alkyl groups containing more than 2 carbon atoms in the diamines may also be different such as 2,4'-diamino-3,5-diethyl-3',5'-diisopropyldicyclohexylmethane, 4,4'-diamino-3,5-diethyl3',5'-diisopropyldicyclohexyl-[2,2 -dimethyl[1-methane and, most preferably, 4,4'-diamino-3,5-diethyl-3',5'-diisopropyl-dicyclohexylmethane.

These asymmetrically substituted dicyclohexylalkane diamines may also contain their symmetrical tetraalkyl isomers in admixture such as 4,4'-diamino-3,3',5,5'-tetraethyl- and -3,3',5,5'-tetraisopropyldicyclohexylmethane in combination with the last of the above-mentioned compounds. These mixtures may be obtained by hydrogenation of the diamine mixtures from the reaction of formaldehyde with 2,6-diethylaniline and 2,6-diisopropylaniline mixtures. Particularly preferred diaminodicyclohexylalkanes for the process are 4,4'-diamino-3,3',5,5'-tetraethyldicyclohexylmethane and 4,4'-diamino-3,3',5,5'-tetraisopropyldicyclohexylmethane.

According to the invention, the diamine chain-extending agents (B) are generally used in the form of an about 5 to 35% by weight, preferably about 10 to 25% by weight solution in an organic solvent which is free from ketone or aldehyde groups. In this case too, suitable solvents are esters or ethers of the type already mentioned, aromatic hydrocarbons such as toluene and preferably, ethylacetate.

In one particularly preferred and commercially advantageous embodiment, the diamine chain-extending agents (B) are used in the form of a diamine composition. This composition is based on reaction products of the amines with subequivalent quantities of NCO prepolymers. Generally <20 equivalent %, preferably about 1 to 10 equivalent % and most preferably about 1 to 7 equivalent % of the amino groups are reacted with the NCO groups of the NCO prepolymers. For reasons of stability of the diamine preparations, it is preferred to use NCO prepolymers based on hydroxypolyethers (or hydroxypolyacetals or hydroxypolythioethers) because NCO prepolymers based on hydroxypolyesters can form amides with the cycloaliphatic diamines during storage. Suitable hydroxypolyethers (acetals, thioethers) include hydroxypolyether diols such as those mentioned in regard to preparation of the NCO prepolymers. Preferred polyisocyanates are aliphatic and/or cycloaliphatic diisocyanates because they do not adversely affect the light stability of the reactive compositions, as is the case with aromatic diisocyanates. The NCO prepolymers preferably correspond to a diol:diisocyanate ratio of about 1:2 or lower so that they contain as little free monomeric diisocyanate as possible. The NCO content of these NCO prepolymers is preferably about 1 to 6% by weight, most preferably about 2 to 4.5% by weight.

The diamine compositions also contain the above-mentioned solvents in such quantities that the reactive mixture contains no more than about 70% by weight of solvent.

The advantage of using the diamine compositions (B) is that the diamines do not crystallize out, the compositions also have a certain lubricating effect in the pumps or other metering units and shows a slightly increased viscosity so that the preparations may also contain pigments and fillers and other additives and still form stable, safely meterable dispersions.

Both for reasons of cost and also for reasons of process technology, it is best to use as little solvent as possible in the process according to the invention.

When coating systems having a relatively low solvent content are used, it is possible to obtain relatively thick, bubble-free coatings with each application which is desirable when the coating systems are applied to substrates.

The solvent content of the reactive systems may be about 0 to 70% by weight, preferably up to about 50% by weight and most preferably up to about 30% by weight.

It is also possible with the diamines (B) or the diamine compositions (B) to use trifunctional or even monofunctional reaction components such as triamines, triols, polyols, monoamines and monoalcohols in limited amounts, although the average functionality of the components (B) should be $\leq 2.2$, preferably $\leq 2.1$ and more preferably $\leq 2.05$.

When at least one of the components (A) or (B) has a functionality 2.0, the sum of the functionalities of the prepolymer and the amine minus two should not be above or below certain values in accordance with the following relation:

$$f'_{(A)} + f_{(B)} - 2 \xrightarrow{\text{values between}} \geq 1.95 \text{ and } \leq 2.8, \text{ preferably}$$
$$\geq 1.98 \text{ and } \leq 2.7, \text{ and most preferably}$$
$$\geq 2.0 \text{ and } \leq 2.65.$$

The coatings produced by the process preferably have thicknesses of about 0.05 to 5 mm, preferably about 0.10 to 2.0 mm and most preferably about 0.10 to 0.90 mm. In the case of skiver, the coatings generally have a layer thickness of about 0.15 to 0.85 mm, preferably about 0.2 to 0.3 mm and, in the case of buffed grain leather, a thickness of about 0.05 to 0.6 mm, preferably about 0.1 to 0.2 mm. The coating as a whole may be applied in one or more layers as is standard practice in industry. Thick coatings may be applied to textile substrates such as conveyor belts or awning cloths and may have thicknesses of greater than about 1 mm, for example about 1 to 5 mm.

According to the invention, it is generally preferred not to add a polyurethane catalyst to the two-component system used for coating. However, if the systems used for coating have an equivalent ratio of isocyanate groups to amino groups greater than about 1.3:1, preferably greater than about 1.6:1 and which therefore require water or hydroxyl compounds as additional an chain-extending agent, it is often advisable to use catalysts known per se for the polyisocyanate polyaddition reaction. Suitable catalysts include tertiary amines, metal salts and organo-metallic compounds of the type described in DE-OS Nos. 2,854,384 or 2,920,501. The catalysts are generally used in a quantity of about 0.01 to 1% by weight, based on the two-component reactive system as a whole.

According to the invention, the diamine chain-extending agent must provide the reaction mixture with a sufficient, but not overly long reaction time before gelation. It was extremely surprising to find that it is possible with the non-blocked tetraalkyl dicyclohexylalkane diamines in combination with the non-blocked NCO prepolymers to achieve a favorable reactivity which enables the mixture to be metered, mixed, processed without interruption in the applicators and applied to the substrate, so that the sprayed composition levels adequately and bonds sufficiently firmly with the substrate, subsequently gellating and then reacting off quickly to form the polymer.

In accordance with the reactivity test described in detail in the examples, mixtures which reach a viscosity of approximately 60,000 mPa.s are preferred and are particularly suitable for the process. Reactivity times of from about 80 to 180 seconds are particularly preferred. If the reactivity times are below the required limit, corresponding mixtures can no longer be applied, even using continuously and very rapidly mixing spray guns, or do not level sufficiently on or adhere sufficiently to the substrate. On the other hand, reactive mixtures having longer reactivity times are more difficult to apply and penetrate less readily into the substrate.

The organic or inorganic pigments, dyes, stabilizers, antioxidants, levelling agents or other auxiliaries of polyurethane chemistry which are normally used in the coating industry may be added to the reaction components, i.e, either to the NCO prepolymer (A) or to the solution of the diamine chain extender or the diamine composition (B). Levelling agents may be added in a quantity of about 0.01 to 5%, preferably about 0.1 to 3% by weight, based on the reactive component system as a whole. Examples include levelling agents such as tributyl phosphate, ricinoleic acid esters, organofluorine compounds, silicones, polyether silicones or block copolymers containing both polysiloxanes and also polyether residues. The polyether siloxanes generally have a molecular weight of about 1000 to 5000.

As mentioned at the beginning, the two-component system is applied to the substrate by spraying according to the process of the invention, preferably using a spray gun incorporating an internal mixing facility. Apparatus for mixing and applying reactive, free-flowing compositions such as two-component polyurethane reactive systems in reverse coating are known. It is preferred to use a spray gun incorporating an internal mixing facility which does not have any of the disadvantages attending mixers of the type used hitherto (leakiness, bubble formation, poor mixing quality or long residence times). In the spray gun, the components are first introduced into a premixing chamber and premixed with a gas. The resulting gas/liquid mixture is delivered immediately after its formation to a short, low pressure loss static mixer with crossing baffles and a narrow residence time range. This mixing unit which is preferably used in accordance with the invention contains a cylindrical mixing chamber with inlets for the individual components of the reactive coating system and for gas and an outlet opening in the end wall of the mixing chamber. The inlets for at least one component and for the inert gas are installed in the mixing chamber in such a way that component(s) and gas flow substantially tangentially into the mixing chamber from the cylinder surface. The inlet(s) for the other component are staggered downstream. A static mixer is present between the inlets and the outlet openings. Apart from thorough mixing of the components, a short residence time in the mixing chamber is achieved with mixing units of this type. One such mixing unit is described in detail in DE-OS No. 28 26 232. However, it is possible to use any other standard commercial mixing units and spray guns for mixing PU reactive mixtures for the process according to the invention.

The reactive mixture may be applied from the mixer by attaching the mixing unit to a traversing carriage moving perpendicularly to an underlying conveyor belt which advances uniformly in a perpendicular direction to the traversing movement of the mixing unit. This method of coating substrates of all kinds is described, for example, in "Das Leder" (1974), pages 162 to 166.

As already mentioned, the process according to the invention is suitable both for the direct coating and also the reverse coating of various substrates, especially leather, skiver and textile materials. In direct coating, the two-component reactive system is sprayed onto the surface of the substrate to be coated, and the material thus coated is subsequently introduced into a drying tunnel in known manner. In the case of leather, the drying temperature should not exceed about 100° C. while in the case of textile substrates, it should not exceed about 200° C. (160° C). In general, leather-based substrates are dried for about 2 to 15 minutes, preferably about 3 to 6 minutes at about 60° to 80° C, while textile substrates are dried for about 1 to 10 minutes, preferably about 1 to 4 minutes at about 120° to 160° C. During drying, the coating reacts and hardens and the solvent, if any, evaporates.

The process according to the invention may be used for reverse coating in conjunction with coating machines of the type described, for example, in "Das Leder" (1974), No. 9, pages 162 et. seq. A corresponding process is described in DE-OS No. 28 26 232.

The invention is further illustrated but is not intended to be limited by the following examples in which all parts and percentages are by weight unless otherwise specified.

EXAMPLES

Note:

The functionality f of the compounds, mixtures (f') reaction products (f") used is calculated on the basis of the following formulae:

(I) Conversion from molecular weight and OH number $$f = \frac{\text{molecular weight} \times \text{OH number}}{56 \times 1000}$$

This formula is commonly used for conversion from OH number to molecular weight or vice versa when the functionality f, for example of polyhydroxyl compounds, is known.

(II) The average functionality f' of (non-interreacting) mixtures of, for example, polyols of different functionality f, polyamines of different functionality f, or polyisocyanates of different functionality f is calculated in accordance with the following formula:

$$f' = \frac{\epsilon \text{ equiv}}{\epsilon \text{ moles}}, (\epsilon = \text{sum of})$$

wherein the number of equivalents (equiv) equals number of moles x functionality (f).

(III) f" is the (average) fuactionality of interrracting starting materials, optionally having different functionalities. This formula may be used for determining the functionality of an NCO prepolymer formed from polyols and polyisocyanates or the functionality of a polyester formed from polycarboxylic acids and polyols.

$$f'' = \frac{\epsilon \text{ equiv } A -}{\epsilon \text{ mole } (A + B)} - \frac{\epsilon \text{ equiv } B}{\epsilon \text{ equiv } B}$$

wherein A is the excess component (for example the polyols in the preparation of hydroxypolyesters or the polyisocyanates in the preparation of NCO prepolymers).

Preparation of the NCO prepolymers

Prepolymer A 666 g of 1-isocyanato-3-isocyanatomethyl-3,5,5-trimethylcyclohexane (isophorone diisocyanate) were introduced into a reactor. 850 g of a hydroxyl polyester of adipic acid, neopentyl glycol and 1,6-hexane diol (glycol ratio 35:65, hydroxy number 66, functionality f=2) were then added with stirring at room temperature. The reaction mixture was heated for 7 h at 80° C. until an NCO content of 13.8% was reached. The reaction mixture was then distilled at 180° C./0.13 mbar in a thin-layer evaporator. The resulting resin was diluted with ethylacetate to form an 80% solution. The prepolymer solution had a viscosity of 1200 mPa.s at 23° C., an NCO content of 3.0% and a free isophorone diisocyanate content of 0.4%. The NCO equivalent weight was 1400 g. The functionality f" was 2.

NCO Prepolymer B 2775 g of isophorone diisocyanate were introduced into a reactor. A mixture of 2000 g of a hydroxyl polyether based on 1,2-propane diol and propylene oxide (hydroxyl number 56, functionality f=2, molecular weight 2000) and 3000 g of a hydroxyl polyether based on glycerol and propylene oxide (hydroxyl number 56, molecular weight 3000 and functionality f=3) were then added with stirring at room temperature, followed by reaction for 6 h at 100° C. until an NCO content of 10.8% was reached. Thin-layer distillation of the reaction mixture at 180° C./0.1 Torr gave a prepolymer having a viscosity at 23° C. of 7700 mPa.s, an NCO content of 3.0% and a free isophorone diisocyanate content of 0.4%. The NCO equivalent weight was 1400 g and the functionality f" of the prepolymer was 2.5 (without consideration of the small quantity of IPDI left after thin layer distillation).

NCO Prepolymer C 582 g of 1-isocyanato-1-methyl-4(3)-isocyanatomethylcyclohexane (I) (isomer ratio=80/20) were introduced into a reactor. 2550 g of a polyester prepared from the same materials described for prepolymer A, but having an OH number of 56 were then added at room temperature. The reacting mixture was heated and reacted for 4 hours at 60° C. The temperature was then increased to 80° C. and the mixture was left to react until a constant NCO value was obtained. The reaction mixture was then diluted to an 80% solution by the addition of 783 g of ethylacetate. The prepolymer solution had a viscosity at 23° C. of 2050 mPa.s, an NCO content of 3.18% and a free diisocyanate I content of 0.35%. The calculated NCO equivalent weight was 1320 g and the functionality f" of the prepolymer was 2.

NCO Prepolymer D 388 g of 1-isocyanato-1-methyl-4(3)-isocyanatomethyl cyclohexane (I) (mixture of the isomers in a ratio of about 80:20) and a mixture of 800 g of a hydroxyl polyether based on 1,2-propane diol and propylene oxide (hydroxyl number 56, molecular weight 2000) and 1200 g of a hydroxyl polyether based on glycerol and propylene oxide (hydroxyl number 56, molecular weight 3000) were introduced into a reactor with stirring at room temperature and reacted at 90° C. until an NCO content of 3.3% was reached. The prepolymer had a viscosity of 5100 mPa.s and a free diisocyanate I content of 0.32%. The calculated NCO equivalent weight was 1273 g and the functionality f" of the prepolymer was 2.5.

NCO Prepolymer E 378.3 g of 1-isocyanato-1-methyl-4(3)-isocyanatomethyl cyclohexane (I) and 39.1 g of a trimer-polyisocyanate based on 1,6-diisocyanatohexane (NCO content 21.5%) were introduced into a reactor. 1750 g of the difunctional polyester of prepolymer C (OH number 56) were then added at room temperature and, after heating to 65° C., the mixture was reacted for 5 hours. The temperature was then increased to 80° C. and the mixture was reacted until a stable NCO content was obtained. The solids content was then adjusted to 80% by dilution with 541.9 g of ethylacetate. The prepolymer solution had a viscosity at 23° C. of 2430 mPa.s, an NCO content of 2.9% and a free diisocyanate I content of 0.45%. The calculated NCO equivalent weight was 1449 g: f"=2.06.

NCO Prepolymers F–H (General procedure)

In a reactor, a mixture of isophorone diisocyanate (IPDI) and a 60% solution of a polyisocyanurate based on a mixture of 3 moles of 2,4-diisocyanatotoluene and 2 moles of 1,6-diisocyanatohexane in ethylacetate (NCO content 10.5%) was reacted with the hydroxyl polyester (OH number 56) of Prepolymer C in the same way as for Prepolymer A, distilled and dissolved in ethylacetate to form an 80% solution.

TABLE I

| Prepolymer | IPDI | Polyisocyanurate [g] | Polyester | NCO [%] | 80% Solution Viscosity [mPa.s] | free IPDI [%] | NCO-equiv [g] |
|---|---|---|---|---|---|---|---|
| F | 5000 | 83 | 3920 | 2.88 | 1400 | 0.21 | 1458 |
| G | 5000 | 260 | 3920 | 2.81 | 2100 | 0.12 | 1495 |
| H | 5000 | 414 | 3920 | 2.69 | 2780 | 0.25 | 1561 |

Prepolymer I (Comparison)

In a reactor, 2400 g of the polyester of Prepolymer C (OH number 56) were added to a solution of 658 g of isophorone diisocyanate and 125 g of the polyisocyanurate solution (NCO:10.5%) of Prepolymer E in 792 g of ethylacetate. After heating to 80° C., the mixture was left to react for 4 hours until an NCO content of 3.4% was reached. The 80% solution had a viscosity at 23° C. of 3100 mPa.s and a free isophorone diisocyanate content of 3.7%. The calculated equivalent weight was 1235 g.

Prepolymer K (Comparison)

In a reactor, 2534 g of the polyester of Prepolymer C (OH number 56) were added at room temperature to a solution of 530 g of a 65:35 mixture of 2,4- and 2,6-diisocyanatotoluene and 135 g of the polyisocyanurate solution (NCO: 10.5%) of Prepolymer E in 800 g of toluene. The reaction mixture was reacted at 80° C. until a constant NCO content of 3.25% was reached. The 80% prepolymer solution had a viscosity at 23° C. of 4300 mPa.s. The calculated NCO equivalent weight was 1295 g.

The amine mixtures on which the process according to the invention is based are referred hereinafter as "hardeners".

Hardener 1

266 g of 3,3',5,5-tetramethyl-4,4'-diaminodicyclohexylmethane were mixed with 934 g of ethylacetate. NH$_2$-equivalent weight of the solution: 600 g.

Hardener 2

A solution of 294 g of 3,3'-diethyl-5,5'-dimethyl4,4'-diaminodicyclohexylmethane in 906 g of ethylacetate. NH$_2$-equivalent weight of the solution: 600 g.

Hardener 3

322 g of 3,3'5,5'-tetraethyl-4,4'-diaminodicyclohexyl methane were dissolved in 878 g of ethylacetate. NH$_2$-equivalent weight of the solution: 600 g.

Hardener 4 (Comparison)

A solution of 238 g of 3,3'-dimethyl-4,4'-diaminodicyclohexylmethane in 962 g of ethylacetate. NH$_2$ equivalent weight of the solution: 600 g.

Hardener 5 (Comparison)

A solution of 238 g of 3,3'-dimethyl-4,4'-diaminodicyclohexylmethane in 962 g of methylethylketone was heated under reflux for 4 h. NH$_2$-equivalent weight of the solution: 600 g (in partially blocked form).

Hardener 6 (Comparison)

A solution of 170 g of 3,3,5-trimethyl-5-aminomethylcyclohexylamine (IPDA) in 1030 g of ethylacetate. NH$_2$-equivalent weight of the solution: 600 g.

Hardener 7 (Comparison)

A mixture of 170 g of IPDA, 13 g of water and 417 g of methylethylketone was refluxed for 2 h and then cooled. NH$_2$-equivalent weight of the solution: 300 g (cf. DE-OS No. 26 37 115, hardener 1).

Reactivity test

In a 500 ml sample beaker, 0.108 equivalents of NCO prepolymer were diluted with the corresponding quantity by weight of toluene (to form a 40% solution in the case of Prepolymers A, C, E-K and a 50% solution in the case of Prepolymers B, D) and then hand-mixed for 10 seconds at room temperature (23° C.) with 0.1 equivalents of hardener solution using a glass rod. The increase in the viscosity of the reaction mixture as a function of time was then measured using a Haake viscosimeter (test element E 100).

The time (in seconds), which the reaction mixture took to reach a viscosity of 60,000 mPa.s and which is crucial to the process according to the invention, is shown in the following Table.

TABLE II

| Prepolymer | Hardener 1 | 2 | 3 | 4 (Comp.) | 5 (Comp.) | 6 (Comp.) | 7 (Comp.) |
|---|---|---|---|---|---|---|---|
| A | 115" | 118" | 117" | <5" | >900" | <5" | >900" |
| B | 123" | 118" | 128" | <5" | >900" | <5" | >900" |
| C | 165" | 165" | 172" | <5" | >900" | <5" | >900" |
| D | 170" | 168" | 175" | <5" | >900" | <5" | >900" |
| E | 167" | 162" | 167" | <5" | >900" | <5" | >900" |
| F | 177" | 175" | 183" | <5" | >900" | <5" | >900" |
| G | 126" | 126" | 130" | <5" | >900" | <5" | >900" |
| H | 115" | 120" | 120" | <5" | >900" | <5" | >900" |
| I (Comparison) | 72" | 73" | 71" | <5" | 408" | <5" | 270" |
| K (Comparison) | 5" | 5" | 5" | <5" | 639" | <5" | 130" |

APPLICATION EXAMPLES

Test Procedure (Laboratory reactive coatings and their testing)

The suitability of NCO prepolymers and diamines for application by reactive coating was assessed in a laboratory test.

The formulation used was the one previously described with regard to the "reactivity test."

NCO prepolymers based on polyether polyols were adjusted to a solids content of 50% by dilution with toluene. NCO prepolymers based on polyester polyols were adjusted to a solids content of 40% by weight by dilution with toluene. The diamine component was dissolved in ethylacetate such that 600 g of the solution corresponded exactly to one equivalent of $NH_2$. The solids content was an arbitrary amount, but one which was observed throughout the examples. Other components such as lubricants, levelling agents and pigments were optionally incorporated into the diamine solution.

However, the diamine solution or rather the diamine composition preparation was generally used without pigments for testing.

As already mentioned with reference to the reactivity test, the two reactants were reacted in a ratio of 1.08 equivalent NCO to 1.00 equivalent $NH_2$.

Formulation Example:

100 g of an NCO prepolymer containing 1.7% NCO were reacted with 22.5 g of a diamine composition having a diamine concentration of 1 equivalent=600 g.

The components were intensively hand-mixed by stirring with a glass rod for 10 seconds and the resulting mixture was poured out onto a glass plate to form a bubble-free layer of uniform laver thickness. The solvent mixtures present were then evaporated off over a period of at least 12–24 hours at room temperature. The film was then heated for 2 hours at 80° C. and carefully detached from the plate. This film was then tested for tensile strength and breaking elongation in accordance with DIN 53 328 and for tear propagation resistance in accordance with DIN 53 329. The following results were obtained.

TABLE

| NCO prepolymer | Diamine | Breaking elongation (%) | Tensile strength (N/mm$^2$) | Tear propagation resistance (dN/cm) |
| --- | --- | --- | --- | --- |
| A | hardener 1 | 593 | 194 | 44.2 |
| A | hardener 2 | 505 | 87 | 33.8 |
| A | hardener 3 | 521 | 162 | 46.5 |
| B | hardener 1 | 620 | 109 | 27.7 |
| B | hardener 2 | 556 | 105 | 9.0 |
| B | hardener 3 | 533 | 108 | 10.1 |

Application in continuous industrial processes

The process was carried out in special installations in which, according to the prior art, the reactive PU mixture was applied by spraying in two or more successive layers. This method of application was largely dictated by practical requirements and did not affect the chemical requirements. It did enable differences in the formulation of the individual coatings to be incorporated as required in the layered structure.

The principal components of the spray guns include a heatable reservoir for the prepolymer, a reservoir for the hardener, a metering unit for the hardener and one for the prepolymer and, for externally mixing and spraying the components, a PU two-component spray gun comprising an integrated nozzle, a feed for the prepolymer, a feed for the hardener and a feed for compressed air.

Prepolymer A was introduced into the heatable reservoir and heated to 60° C. to reduce its viscosity. Hardener mixture 1 was introduced into its reservoir, optionally together with pigments. The prepolymer and hardener were introduced into the gun in the ratio of their equivalent weights (equivalent quantities) through separate hoses with intermediate metering units. The delivery volume was variable and depended upon the required layer thicknesses, the spraying width and the speed of travel of the belt on which the substrate (textile material, skiver) to be coated was transported beneath the spray gun. At the outlet opening of the spray gun, the two components were mixed by the air eddies generated by the compressed air (operation pressure 4.5 kg/cm$^2$). For uniform application, the spray gun was moved back and forth over a width of 150 cm about 28 to 82 times per minute.

In the reverse process for example, a matrix coated with silicone rubber or other temporary supports patterned to give the impression of natural leather passed beneath the spray gun at a speed of at least about 1.6 m/minute. The mass sprayed onto the temporary support leveled to form a film and began to harden about 1 minute after the end of spraying. The skiver to be coated was placed on and gently pressed into the reacting composition. The overall coating then passed through a drying tunnel heated to 80° C. About 6 minutes after the end of spraying, the coating was tack-free and the temporary support was removed.

The coated material had a grain very similar to natural leather, could be stacked after a short time and could be processed in conventional shoe machines. The adhesion between the coating and the skiver was excellent and the feel was pleasantly dry.

The coated leather withstood the Flexometer test
1. dry: no damage after flexing 100,000 times
2. wet: no damage after flexing 100,000 times
3. at −25° C. no damage after flexing more than 10,000 times.

FORMULATION EXAMPLES

Formulation ExampLE I 100 g of NCO Prepolymer A (NCO content 3.0%) were reacted with 40 g of amine hardener solution (600 g=1 equivalent of diamine) and 4 g of a black pigment and sprayed in two successive coats onto a matrix to give a total coating weight of 300 g/m$^2$ of NCO prepolymer.

For a normal working speed of 4 m/minute and a coating width of 1.5 m, a total of 1800 g of NCO Prepolymer A was discharged per minute. Skiver was incorporated in known manner in the reacting polyurethane urea composition which was removed from the temporary support after a residence time of 6 minutes at 80° C. in a drying tunnel.

The skiver coated in this way by the reverse coating process had a dry surface and the grain imparted by the temporary support.

After 3 days, the durability of the coated skiver was tested using a Bally Flexometer. It was undamaged after flexing at least 100,000 times when dry, at least 100,000 times when wet and at least 10,000 times at −20° C.

Formulation Example II

Formulation I was followed except that 15% of a brown iron pigment was used instead of 10% of a black pigment, and Prepolymer B was used instead of Prepolymer A, i.e., 100 g of Prepolymer B (3% NCO), 40 g of amine hardener solution 3 and 6 g of pigment (15% of pigment, based on the hardener composition) i.e., coating was carried out in the same way as above for formulation I, two successive applications, weight of NCO prepolymer coating 300 g/m². A brown-colored, coated skiver having the Flexometer values indicated above for Formulation I was obtained.

Formulation Example III

In the same as for Formulations I and II, a white coating was applied using a TiO₂ white pigment preparation, the pigment being used in a quantity of 20% by weight, based on the hardener composition, so that the formulation comprises:
100 g of NCO prepolymer A and
40 g of amine hardener 3 and 8 g of white pigment.

A white-colored, coated skiver having the Flexometer values indicated above for Formulation I was obtained.

Formulation Example IV

Two coatings were used which differed only with regard to the fact that the first coating was pigmented as described for Formulation I: the second coating remained unpigmented. The first coating was based on
100 g of NCO prepolymer A,
40 g of amine hardener 1 and
4 g of black pigment
while the second coating was based on
100 g of NCO prepolymer A and
40 g of amine hardener 1.
As in the other formulations, 900 g per minute of NCO Prepolymer A and the corresponding quantity of amine hardener were applied in each coating. A black-colored, coated skiver which again had the Flexometer values indicated for Formulation I was obtained. The Flexometer values quoted were average values, but were generally exceeded in practice. The Flexometer test was terminated after the indicated flex count.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A process for the production of a light stable, solvent-resistant polyurethane urea elastomer coating on a substrate by the direct or reverse coating process which comprises
(I) continuously and separately introducing into a mixer the following components
   (A) an NCO prepolymer having an NCO content of about 0.5 to 6% by weight, an overall functionality f″ of about 1.95 to 2.8 and a monomeric diisocyanate content of less than about 2% by weight, said NCO prepolymer being either in liquid form or dissolved in an inert solvent having a boiling point of up to about 150° C. to form a solution having a solids content of at least about 70% by weight, said NCO prepolymer comprising the reaction product of
   (a) a polyhydroxyl compound having a molecular weight of 400 to about 10,000 and an average functionality of about 1.90 to 2.8 with
   (b) an isocyanate component comprising
      (1) about 85 to 100 % by weight of an aliphatic or cycloaliphatic diisocyanate and
      (2) 0 to about 15% by weight of a polyfunctional polyisocyanate containing at most one aromatic NCO group and at least two aliphatic or cycloaliphatic NCO groups, and
(B) a diamine present in a solvent free from aldehyde- or ketone-carbonyl groups, said diamine solution comprising a 2,4′- and/or 4,4′-diamino-3,3′,5,5-tetraalkyldicyclohexylalkane which corresponds to the formula

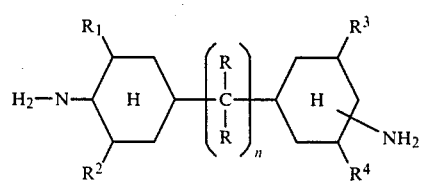

wherein
R¹ to R⁴ may be the same or different and represent straight-chain or branched C₁–C₄ alkyl groups, and
R represents H, CH₃, C₂H₅, C₃H₇ or C₄H₉ provided that the group R—C—R contain no more than 4 carbon atoms and
n is 1, 2 or 3,
(II) mixing said components and
(III) continuously discharging the reactive mixture onto the desired substrate in accordance with the direct process or, in accordance with the reverse coating process, onto an intermediate support and placing the substrate in contact with the reactive mixture while it is still reacting.

2. The process of claim 1 wherein component B is present in the form of a diamine composition which comprises the reaction product of said diamine B with a difunctional NCO prepolymer based on an hydroxyl polyether and an organic diisocyanate in an NH₂ to NCO equivalent ratio of about 100:1 to 10:1.

3. The process of claim 1 wherein said aliphatic or cycloaliphatic diisocyanate comprises a member selected from the group consisting of isophorone diisocyanate, 2,4′-diisocyanatodicyclohexylmethane and 4,4′-diisocyanatodicyclohexylmethane.

4. The process of claim 1 wherein said NCO prepolymer A has an NCO content of about 2 to 4.5% by weight, an overall functionality of f″ of about 2 to 2.7 and a monomeric diisocyanate content of less than about 1% by weight.

5. The process of claim 1 wherein R represents H in both occurrences or CH₃ in both occurrences.

6. The process of claim 1 wherein no more than two of the groups R¹ to R² are methyl groups.

7. The process of claim 1 wherein component B comprises 4,4′-diamino-3,3′,5,5′-tetraethyldicyclohexylmethane.

* * * * *